United States Patent [19]

Fujioka et al.

[11] 4,335,324
[45] Jun. 15, 1982

[54] ROTOR FOR HYDROGEN-COOLED ROTARY ELECTRIC MACHINES

[75] Inventors: Kazumasa Fujioka, Shimoinayoshi; Wataru Nakayama, Kashiwa, both of Japan

[73] Assignee: Hitachi, Ltd., Tokyo, Japan

[21] Appl. No.: 175,699

[22] Filed: Aug. 6, 1980

[30] Foreign Application Priority Data

Aug. 8, 1979 [JP] Japan .................................. 54-100261

[51] Int. Cl.$^3$ ................................................ H02K 1/32
[52] U.S. Cl. ........................................ 310/61; 310/59; 310/65
[58] Field of Search .................... 310/52, 53, 55, 58, 310/59, 60, 60 A, 61, 62, 63, 64, 65, 45, 261, 264, 265, 270

[56] References Cited

U.S. PATENT DOCUMENTS

| | | | |
|---|---|---|---|
| 2,786,951 | 3/1957 | Morgan | 310/61 |
| 3,005,119 | 10/1961 | Schmitt | 310/61 |
| 3,322,985 | 5/1967 | Azubkin | 310/61 |
| 4,206,378 | 6/1980 | Albaric | 310/61 |

*Primary Examiner*—R. Skudy
*Attorney, Agent, or Firm*—Craig & Antonelli

[57] ABSTRACT

A rotor for hydrogen-cooled rotary electric machines is provided with a gas inlet chamber and a gas outlet chamber which are circumferentially defined by radially extending partition walls and disposed in a region between a retaining ring holding field windings in position and a rotor shaft. The gas outlet chamber is divided into a first zone located near the polar axis and a second zone located near the interpolar axis.

Rotor cooling gas is introduced through a gas inlet port to the gas inlet chamber to flow to the gas outlet chamber divided into a plurality of zones while cooling the field windings. From the gas outlet chamber, the gas is discharged through axially extending passages and fan-like ventilating devices to the outside of the rotor.

1 Claim, 4 Drawing Figures

ROTOR FOR HYDROGEN-COOLED ROTARY ELECTRIC MACHINES

BACKGROUND OF THE INVENTION

1. Field of the Invention

This invention relates to a rotor for hydrogen-cooled rotary electric machines wherein the rotor is cooled by hydrogen gas.

2. Description of the Prior Art

In rotary electric machines such as hydrogen-cooled rotary electric machine, the following limitations are generally placed on the provision of passages for the gas for cooling the windings at the end of the rotor. A retaining ring for holding the windings in a predetermined position develops stress of high magnitude and it is not desirable to form gas flow passages in the retaining ring. This makes it inevitable to permit the gas to be introduced into and discharged from the windings through an annular surface disposed outside the end surface of the retaining ring and restricted by the rotor shaft. Moreover, the area that can be used for forming the gas inlet and outlet passages is further restricted and becomes essentially smaller than the area of the annular surface because of the fact that laminated windings occupy the major part of the zone between the retaining ring and rotor shaft and a center ring for axially supporting the laminated windings is located beneath the retaining ring. It has hitherto been one of the most important problems in the technology of cooling the windings at the end of the rotor how to provide inlet and outlet ports for the cooling gas under these circumstances.

It has been proposed in the prior art to form grooves in the rotor shaft to increase the area of the gas inlet port for introducing gas into a gas inlet chamber as well as to divide a gas outlet chamber near the polar axis into a first zone near the center ring and a second zone away therefrom with the respective zones communicated to fan-like ventilating means, and to have fan-like ventilating means communicated to a third zone in the gas outlet chamber near the interpolar axis, thereby releasing gases to the outside.

With such prior arrangement, the fan-like ventilating means is provided only at an area near the polar axis, so that it is not possible to enlarge an area for the discharge of gases therethrough and strengthen a driving force for the discharge of gases. In addition, unlike the gases flowing to the first and second zones in the gas outlet chamber, the gases flowing to the third zone are discharged only by one fan-like ventilating means though they include both flows of gases through axially and circumferentially extending channels in the windings. Therefore, sufficient area and driving force for the discharge of the gases can not be obtained to perform an effective cooling of the windings near the interpolar axis.

SUMMARY OF THE INVENTION

It is an object of the present invention to provide a rotor for hydrogen-cooled rotary electric machines which can achieve effectively uniform cooling of the windings about the end of the rotor by an increase of gas flow rate resulting from the increase in an area of gas discharge passages and in a driving force for gas discharge in fan-like ventilating means.

According to the present invention, there is provided a rotor for hydrogen-cooled rotary electric machines in which two separate fan-like ventilating means are provided at the end face of a center ring in corresponding relationship with a third zone of the gas outlet chamber near the interpolar axis to communicate with the third zone through passages provided on the inner and outer peripheries of the center ring, so that an increase of gas flow rate results from the increase in the gas discharge area and driving forces for gas discharge in the fan-like ventilating means.

BRIEF DESCRIPTION OF THE DRAWINGS

FIG. 1 showing a sectional view of a structure of the rotor end near the polar axis;

FIG. 2 showing a sectional view of a structure of the rotor end near the interpolar axis;

FIG. 3 showing a planar development of the rotor end extending from the polar axis to the interpolar axis; and FIG. 4 showing a perspective view of the rotor end.

DESCRIPTION OF THE PREFERRED EMBODIMENT

A rotor for hydrogen-cooled rotary electric machines according to an embodiment of the present invention will be described with reference to FIGS. 1 to 4.

Figure 1:
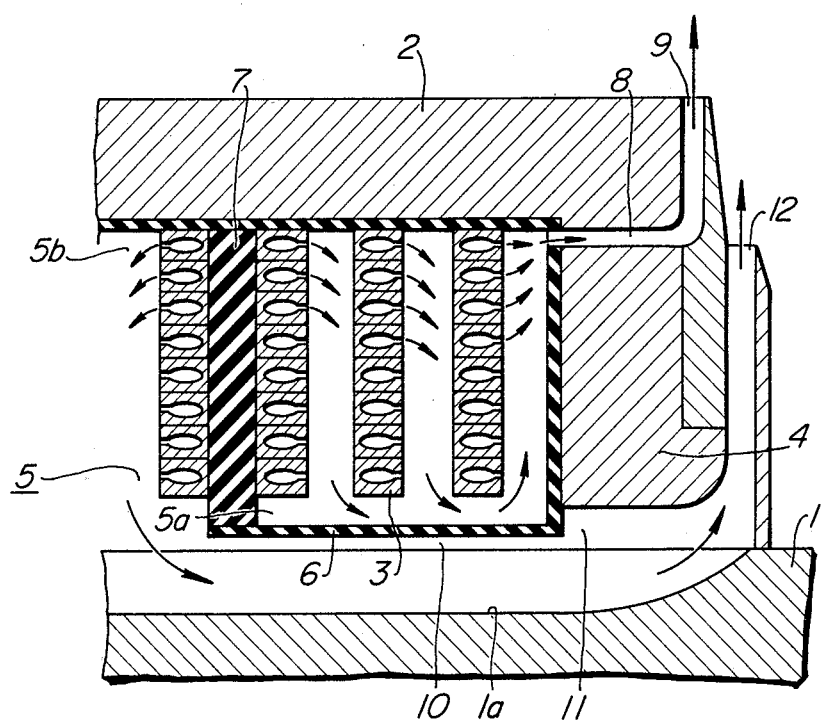
FIGS. 1 to 4 show a rotor for gas-cooled rotary electric machines according to the present invention.

FIG. 1 shows a structure of a gas outlet portion of the rotor end at the polar axis which is constituted by a rotor shaft 1, a retaining ring 2, laminated windings 3 and a center ring 4 secured to the retaining ring 2. A gas outlet chamber 5 is divided into a first zone 5a and a second zone 5b by means of an L-shaped insulating spacer 6 and circumferentially extending segmental insulating spacers 7. The first zone 5a communicates with first fan-like ventilating means 9 disposed at the side of the center ring 4 through a plurality of first axially extending passages 8 formed at the outer periphery of the center ring 4 secured to the retaining ring 2. The rotor shaft 1 is formed with a plurality of grooves 1a which in turn operate with the L-shaped insulating spacer 6 to define gaps 10. Formed on the side of the center ring 4 adjacent to the rotor shaft 1 are second axially extending passages 11. The second zone 5b is communicated through the gaps 10 and second axially extending passages 11 to second fan-like ventilating means 12 disposed outwardly of the first fan-like ventilating means 9. Thus gas is introduced through a gas inlet port, to be described hereinafter, to conductors of the laminated windings 3 to cool same, and then flows toward the first and second zones 5a and 5b of the gas outlet chamber 5. The gas having been discharged from the channels of the conductors of the laminated windings 3 to the first zone 5a of the gas outlet chamber 5 is caused by the first fan-like ventilating means 9 to be discharged outside the rotor through the first axially extending passages 8, and the gas having been discharged to the second zone 5b is caused by the second fan-like ventilating means 12 to be discharged outside the rotor through the second axially extending passages 11.

Figure 2:
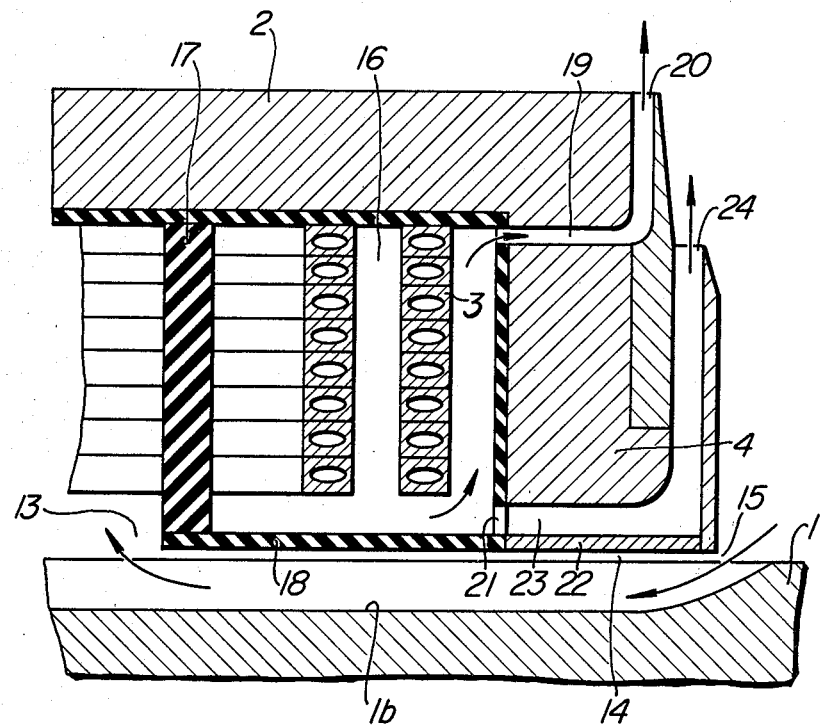

FIG. 2 shows the arrangement of gas inlet and outlet areas of the rotor end in the polar axis. The rotor shaft 1 is also formed with a plurality of grooves 1b, and fifth axially extending passages 14 are formed on the side of the center ring 4 adjacent to the rotor shaft 1 which passages are disposed in circumferentially spaced relationship with the grooves 1a communicating the second zone 5b of the gas outlet chamber with the second fan-like ventilating means 12. A gas inlet chamber 13 is communicated through the grooves 1b and fifth axially extending passages 14. A third zone 16 of the gas outlet chamber is defined by a partition 17 and a L-shaped insulating spacer 18. An area of the third zone 16 of the gas outlet chamber adjacent the retaining ring 2 is communicated through third axially extending passages 19 with third fan-like ventilating means 20 provided at the side of the center ring 4. Provided in the fifth axially extending passages 14 are insulating spacers 22 which are connected to the L-shaped insulating spacers 18 to form fourth axially extending passages 23 therein. Thus an area of the third zone 16 adjacent the rotor shaft 1 is communicated through holes 21 formed in the L-shaped insulating spacers 18 and the fourth axially extending passages 23 with fourth fan-like ventilating means 24.

Figure 3:
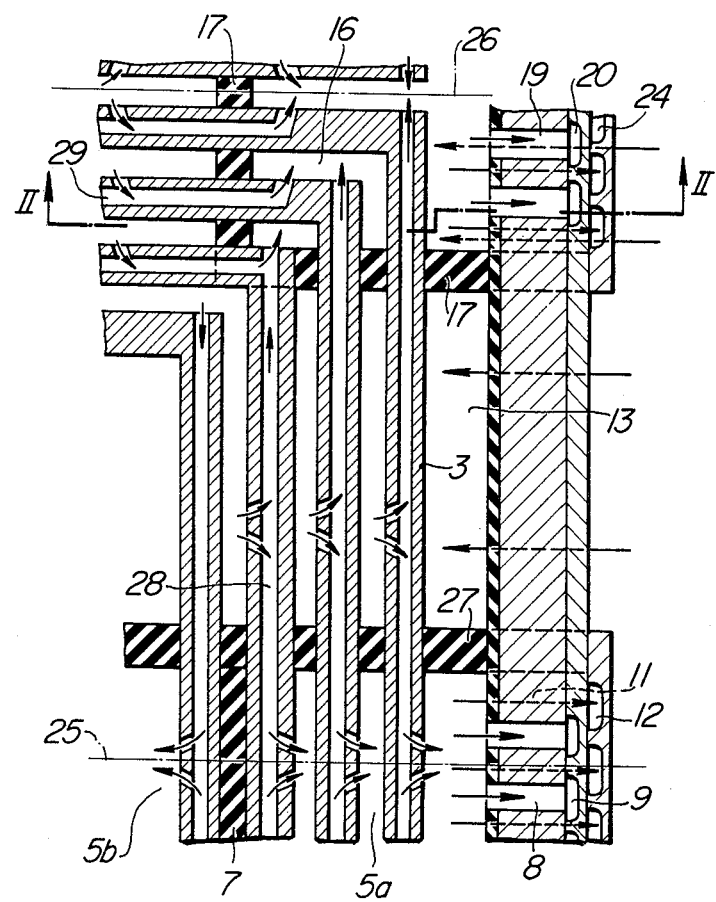

FIG. 3 is a planar development showing an arrangement of the windings showing extending from a polar axis 25 of the end of the rotor to a interpolar axis 26 thereof. The gas inlet chamber 16 is circumferentially separated from the gas outlet chamber by partition walls 17 and 27. FIG. 2 is a sectional view taken along the line II—II in FIG. 3.

Figure 4:
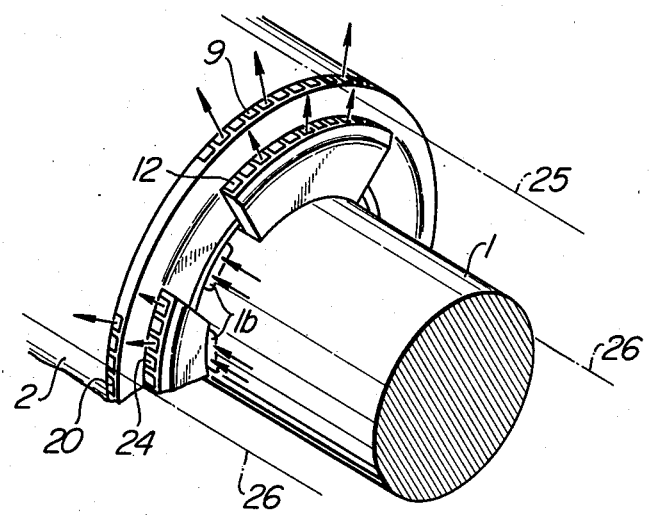

FIG. 4 is a perspective view of the rotor end shown in FIGS. 1-3.

In the rotor structure according to the invention shown in FIGS. 1-4, gas is introduced from the gas inlet port 15 through the fifth axially extending passages 14 into the inlet chamber 13 bounded by the partition walls 17 and 27. Part of the gas introduced into the inlet chamber 13 flows into circumferentially extending channels 28 in the conductors of the windings of the laminated windings 3 to cool the same, and then flows toward the first and second zones 5a and 5b of the outlet chamber 5. The remainder of the gas flows through the circumferentially extending channels 28 or axially extending channels 29 in the conductors of the windings of the laminated windings 3 to cool the laminated windings 3. Thereafter the gas flows toward the third zone 16 of the outlet chamber near the interpolar axis 26. The gas entering the first zone 5a of the outlet chamber 5 is discharged through the first axially extending passages 8 to the first fan-like ventilating means 9 to the outside of the rotor. The gas entering the second zone 5b of the outlet chamber 5 flows through the grooves 1a on the rotor shaft 1, the second axially extending passages 11 and the second fan-like ventilating means 12 to be discharged outside of the rotor.

A part of the gas entering the third zone 16 of the gas outlet chamber is discharged through the third axially extending passages 19 and third fan-like ventilating means 20 to the outside of the rotor, and the remainder of the gas is discharged through the holes 21 in the L-shaped insulating spacers 18, fourth axially extending passages 23 and fourth fan-like ventilating means 24 to the outside of the rotor.

While the fourth axially extending passages 23 are defined in the space between the retaining ring 4 and insulating spacers 22 in the embodiment as shown, similar effects can apparently be obtained with the arrangement in which a number of axially extending passages are provided on the side of the retaining ring 4 adjacent the rotor shaft.

As described above, it will be appreciated that in the rotor for gas-cooled rotary electric machines according to the present invention, it is possible to increase the gas discharge area of the gas outlet chamber and to provide a markedly increased cooling capacity. In addition, the cooling of the windings about the rotor end near the interpolar axis can be greatly improved in accordance with the present invention.

What is claimed is:

1. In a rotor for hydrogen-cooled rotary electric machines including a rotor shaft, a retaining ring for holding laminated windings in position, a center ring secured to said retaining ring, radially extending partition walls, gas inlet and outlet chambers disposed in a region between said rotor shaft and retaining ring and circumferentially partitioned by said center ring and radially extending partition walls, and a plurality of fan-like ventilating means provided on the outer side of the rotor end for discharging outside of the rotor gases which have been introduced from said gas inlet chamber to the laminated windings for the cooling of the same and flowed into said gas outlet chamber, the improvement comprising circumferentially extending partition walls; L-shaped insulating spacers; said gas outlet chamber being divided into first and second zones each located near the polar axis and a third zone located near the interpolar axis by means of said circumferentially extending partition walls, radially extending partition walls and said L-shaped insulating spacers; said plurality of fan-like ventilating means including first fan-like ventilating means disposed on the outer side of said center ring and communicated with the first zone of the gas outlet chamber through first axially extending passages provided on the outer periphery of said center ring, second fan-like ventilating means disposed on the outer side of said center ring and communicated with the second zone of the gas outlet chamber through second axially extending passages provided below said center ring, third fan-like ventilating means disposed on the outer side of said center ring and communicated with the third zone of the gas outlet chamber through third axially extending passages on the outer periphery of said center ring and fourth axially extending passages on the periphery of said center ring, and fourth fan-like ventilating means; said gas inlet chamber communicated with gas inlet ports through fifth axially extending passages which are circumferentially isolated from said second axially extending passages and radially isolated from said fourth axially extending passages.

* * * * *